(12) United States Patent
Dally

(10) Patent No.: US 11,726,757 B2
(45) Date of Patent: Aug. 15, 2023

(54) PROCESSOR FOR PERFORMING DYNAMIC PROGRAMMING ACCORDING TO AN INSTRUCTION, AND A METHOD FOR CONFIGURING A PROCESSOR FOR DYNAMIC PROGRAMMING VIA AN INSTRUCTION

(71) Applicant: Nvidia Corporation, Santa Clara, CA (US)

(72) Inventor: William James Dally, Incline Village, NV (US)

(73) Assignee: NVIDIA Corporation, Santa Clara, CA (US)

( * ) Notice: Subject to any disclaimer, the term of this patent is extended or adjusted under 35 U.S.C. 154(b) by 223 days.

(21) Appl. No.: 16/811,068

(22) Filed: Mar. 6, 2020

(65) Prior Publication Data

US 2021/0048992 A1 Feb. 18, 2021

Related U.S. Application Data

(60) Provisional application No. 62/886,893, filed on Aug. 14, 2019.

(51) Int. Cl.
*G06F 8/41* (2018.01)
*G06F 9/50* (2006.01)
*G06T 1/20* (2006.01)

(52) U.S. Cl.
CPC ............ *G06F 8/451* (2013.01); *G06F 9/5066* (2013.01); *G06T 1/20* (2013.01)

(58) Field of Classification Search
CPC .... G06F 8/451; G06F 9/5066; G06F 9/30036; G06F 9/30123; G06F 17/16;

(Continued)

(56) References Cited

U.S. PATENT DOCUMENTS 7,917,302 B2 * 3/2011 Rognes .................. G16B 30/10
435/6.13
8,688,956 B2 * 4/2014 Omtzigt ............ G06F 15/17381
712/18

(Continued)

FOREIGN PATENT DOCUMENTS

EP 3058463 B1 8/2018
WO WO-2008090336 A2 * 7/2008 ....... G06F 16/90344

OTHER PUBLICATIONS

Sheneman, Luke. (2002). A Survey of Specialized Processor Architectures Applied to Biological Sequence Alignment. Available at , https://www.researchgate.net/publication/228379726_A_Survey_of_Specialized_Processor_Architectures_Applied_to_Biological_Sequence_Alignment> (Year: 2002).*

(Continued)

*Primary Examiner* — Matthew J Brophy

(57) ABSTRACT

The disclosure provides processors that are configured to perform dynamic programming according to an instruction, a method for configuring a processor for dynamic programming according to an instruction and a method of computing a modified Smith Waterman algorithm employing an instruction for configuring a parallel processing unit. In one example, the method for configuring includes: (1) receiving, by execution cores of the processor, an instruction that directs the execution cores to compute a set of recurrence equations employing a matrix, (2) configuring the execution cores, according to the set of recurrence equations, to compute states for elements of the matrix, and (3) storing the computed states for current elements of the matrix in registers of the execution cores, wherein the computed states are determined based on the set of recurrence equations and input data.

25 Claims, 5 Drawing Sheets

(58) Field of Classification Search
CPC .............. G06F 9/3887; G06F 9/30003; G06F 9/30098; G06F 17/11; G06T 1/20
See application file for complete search history.

(56) References Cited

U.S. PATENT DOCUMENTS

| | | | | |
|---|---|---|---|---|
| 9,195,436 B2* | 11/2015 | Mytkowicz | ............... | G06F 8/22 |
| 9,501,448 B2* | 11/2016 | Omtzigt | .............. | G06F 15/8023 |
| 9,767,071 B2* | 9/2017 | Omtzigt | .............. | G06F 15/8023 |
| 10,289,606 B2* | 5/2019 | Omtzigt | ............ | G06F 15/17381 |
| 11,237,575 B2* | 2/2022 | Tokura | .................... | F16K 31/36 |
| 2004/0024536 A1* | 2/2004 | Rognes | .................. | G16B 30/00 702/20 |
| 2007/0076936 A1* | 4/2007 | Li | .......................... | G16B 30/00 382/209 |
| 2008/0086274 A1* | 4/2008 | Chamberlain | ......... | G16B 30/00 702/19 |
| 2009/0300327 A1* | 12/2009 | Omtzigt | ............ | G06F 15/17381 712/42 |
| 2010/0138376 A1* | 6/2010 | Avis | ...................... | G06V 10/955 706/50 |
| 2014/0173192 A1* | 6/2014 | Omtzigt | ................ | G06F 15/825 711/106 |
| 2015/0057946 A1* | 2/2015 | Kural | ...................... | G16B 30/00 702/20 |
| 2015/0106783 A1* | 4/2015 | Mytkowicz | ........... | G06F 9/5066 717/104 |
| 2015/0197815 A1* | 7/2015 | Kural | ................... | C12Q 1/6886 506/2 |
| 2015/0199473 A1* | 7/2015 | Kural | ...................... | G16B 30/00 702/19 |
| 2015/0347678 A1* | 12/2015 | Kural | ...................... | G16B 30/00 702/19 |
| 2015/0347702 A1* | 12/2015 | Chukka | ............ | G01N 33/57415 702/19 |
| 2015/0356055 A1* | 12/2015 | Omtzigt | ................ | G06F 15/825 712/11 |
| 2016/0306921 A1* | 10/2016 | Kural | ...................... | G16B 30/20 |
| 2017/0351642 A1* | 12/2017 | Omtzigt | ............ | G06F 15/17381 |
| 2018/0336314 A1* | 11/2018 | Kural | ...................... | G16B 30/00 |
| 2018/0357367 A1* | 12/2018 | Kural | ...................... | G16B 30/20 |
| 2019/0169695 A1* | 6/2019 | Kural | ...................... | G16B 20/00 |
| 2019/0227983 A1* | 7/2019 | Omtzigt | ............ | G06F 15/17381 |
| 2020/0019196 A1* | 1/2020 | Tokura | ................ | F16K 31/0675 |
| 2020/0168295 A1* | 5/2020 | Kural | ...................... | G16B 30/00 |

OTHER PUBLICATIONS

Alpern, Bowen, Larry Carter, and Kang Su Gatlin. "Microparallelism and high-performance protein matching." Supercomputing'95: Proceedings of the 1995 ACM/IEEE Conference on Supercomputing. IEEE, 1995. (Year: 1995).*

Dimitrov, Martin, Mike Mantor, and Huiyang Zhou. "Understanding software approaches for GPGPU reliability." Proceedings of 2nd Workshop on General Purpose Processing on Graphics Processing Units. 2009 (Year: 2009).*

Qasim, Syed Manzoor, Shuja Ahmad Abbasi, and Bandar Almashary. "A proposed FPGA-based parallel architecture for matrix multiplication." APCCAS 2008-2008 IEEE Asia Pacific Conference on Circuits and Systems. IEEE, 2008. (Year: 2008).*

Wakatani, Akiyoshi. "Evaluation of P-Scheme/G Algorithm for Solving Recurrence Equations." International Journal of Modeling and Optimization 3.4 (2013): 311. (Year: 2013).*

Yoshida, Norihiko. "A transformational approach to the derivation of hardware algorithms from recurrence equations." Conference on High Performance Networking and Computing: Proceedings of the 1988 ACM/IEEE conference on Supercomputing. vol. 12. No. 17. 1988. (Year: 1988).*

Bellman; "Dynamic Programming Treatment of the Travelling Salesman Problem"; RAND Corporation; Mar. 1961; 3 pgs.

* cited by examiner

PROCESSOR FOR PERFORMING DYNAMIC PROGRAMMING ACCORDING TO AN INSTRUCTION, AND A METHOD FOR CONFIGURING A PROCESSOR FOR DYNAMIC PROGRAMMING VIA AN INSTRUCTION

CROSS-REFERENCE TO RELATED APPLICATION

This application claims the benefit of U.S. Provisional Application Ser. No. 62/886,893, filed by William James Dally on Aug. 14, 2019, entitled "A GPU FOR PERFORMING A SMITH-WATERMAN STEP INSTRUCTION, A METHOD EMPLOYING THE GPU, AND A GENOMICS PIPELINE EMPLOYING THE METHOD AND GPU," commonly assigned with this application and incorporated herein by reference in its entirety.

TECHNICAL FIELD

This application is directed, in general, to dynamic programming and, more specifically, to configuring processors to perform dynamic programming to, for example, create specialized execution cores designed to accelerate matrix computations, such as matrix computations of the inner loop of genomics for sequence alignment.

BACKGROUND

Dynamic programming solves complex problems by decomposing them into subproblems that are iteratively solved. In order to solve the complex problems, the subproblems are ordered and results of subproblems that appear earlier in the ordering are used to solve a subproblem that appears later in the ordering. A matrix can be used to store results of the subproblems for computing the later appearing subproblems.

Due to the ability to solve complex problems, dynamic programming algorithms are used to solve problems in diverse areas including economics, engineering, and genomics. Genomics is an area within the field of biology that is interested in the sequencing and analysis of an organism's genome. Genomics is directed to such areas as determining complete DNA sequences and performing genetic mapping to further the understanding of biological systems.

Due to managing the large amount of data associated with genome projects, computational pipelines are often used in genomic applications. For example, a complete pipeline for performing assembly from reads involves seeding, filtering, alignment, consensus, and variant calling. The core operation in most genomics applications is the sequence alignment, which can be reference-based or de novo. Regardless the type, the alignment can be performed via dynamic programming using various algorithms that build an array, wherein each cell or element of the array represents a subproblem of the overall alignment problem, and only the current anti-diagonal of the array is stored at any given time. A Smith-Waterman algorithm is an example of an algorithm that is used for alignment.

SUMMARY

In one aspect, a method of configuring a processor for dynamic programming according to an instruction is disclosed. In one example, the method for configuring includes: (1) receiving, by execution cores of the processor, an instruction that directs the execution cores to compute a set of recurrence equations employing a matrix, (2) configuring the execution cores, according to the set of recurrence equations, to compute states for elements of the matrix, and (3) storing the computed states for current elements of the matrix in registers of the execution cores, wherein the computed states are determined based on the set of recurrence equations and input data.

In another aspect, a processor is disclosed. In one example, the processor includes: (1) a memory configured to store input code including an instruction that specifies mathematical operations to compute a set of recurrence equations employing a matrix, and (2) at least one execution core configured to receive the instruction and input data, perform the mathematical operations on the input data to generate the computed states, and store the computed states for current elements of the matrix in at least one register of the execution core.

In yet another aspect, the disclosure provides a method of computing a modified Smith Waterman algorithm employing an instruction for configuring a parallel processing unit (PPU). In one example, the method of computing includes: (1) receiving, by execution cores of the PPU, an instruction that directs the execution cores to compute a set of recurrence equations for the modified Smith Waterman algorithm employing a matrix, (2) configuring the execution cores, according to the set of recurrence equations, to compute states for elements of the matrix in parallel and in swaths, and (3) computing computed states for current elements of the matrix in swaths, wherein the computed states are determined based on the set of recurrence equations and input sequences.

DESCRIPTION

The disclosure provides processors that are configured to perform dynamic programming according to an instruction. The instruction can be, or be part of an instruction set that is, abstract assembly statements, intermediate representation (IR) statements, or assembly language instructions associated with a specific instruction set architecture (ISA) for a specific processing unit. For example, the instruction can be an instruction, such as a Parallel Thread Execution (PTX)

instruction used with graphics processing units (GPUs) from Nvidia Corporation of Santa Clara, Calif., that are translated at install time to a target hardware instruction set. Additionally, the instruction can be part of the target hardware instruction set that configures the native hardware of a processor without needing a translation. As a hardware instruction set, the instruction can then be backward compatible to abstract assembly statements, such as PTX, or another pseudo-assembly language. The instruction can be adapted to configure different types of processors, such as parallel processors or serial processors. Accordingly, the disclosure relates to configuring both a central processing unit (CPU) and a GPU to perform dynamic programming via an instruction. By using an instruction, the disclosure provides a processor solution that is an improvement over slower, software only solutions and dedicated hardware solutions requiring processing area that is unused when not performing dynamic programming. For example, the instruction may be directed to accelerating gene and protein sequence alignments using dynamic programming that is faster than a software solution and does not waste hardware when alignments are not being performed.

Figure 4:
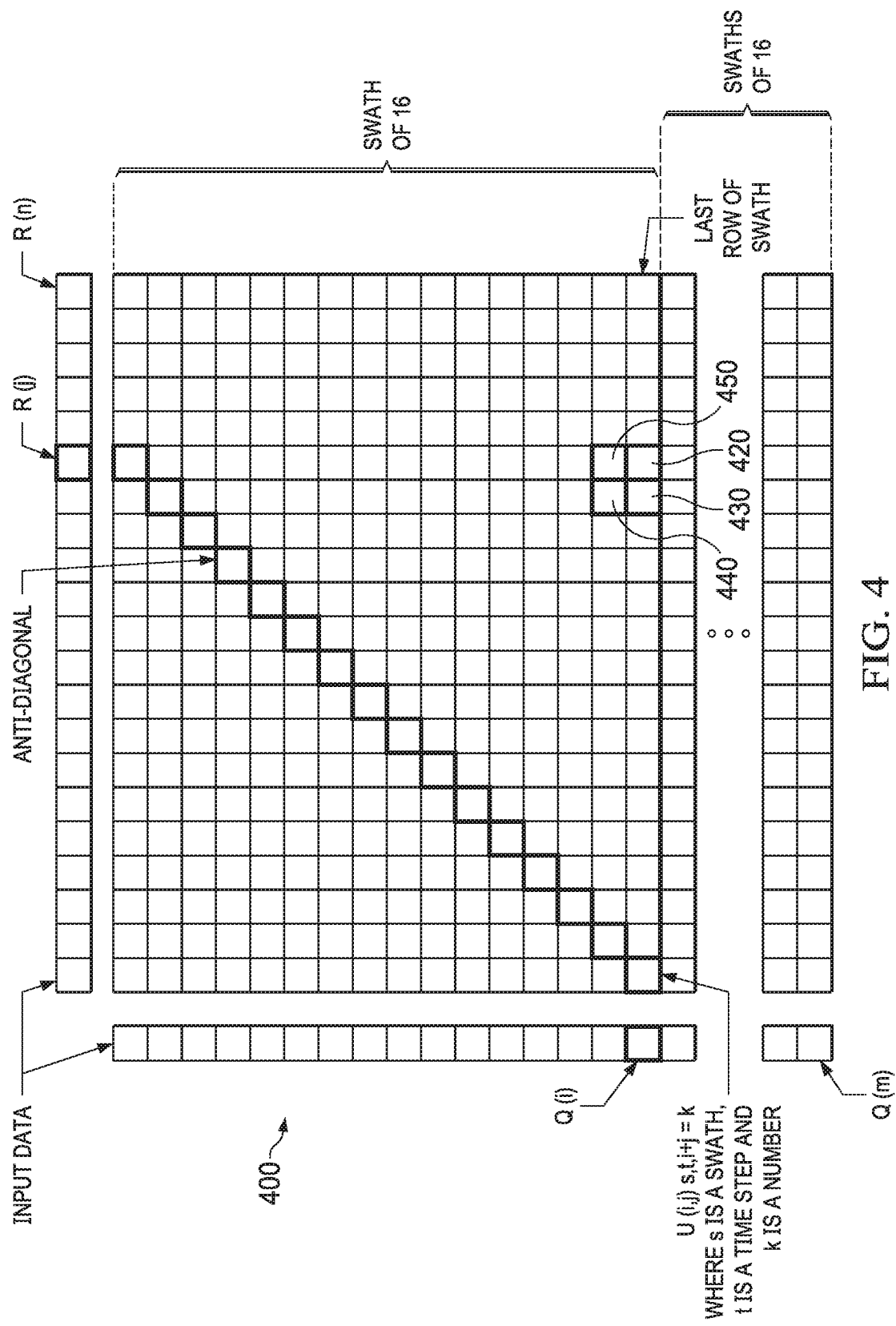
FIG. 4 illustrates a diagram of an example of a matrix employed for computing a set of recurrence equations according to the principles of the disclosure.
Figure 5:
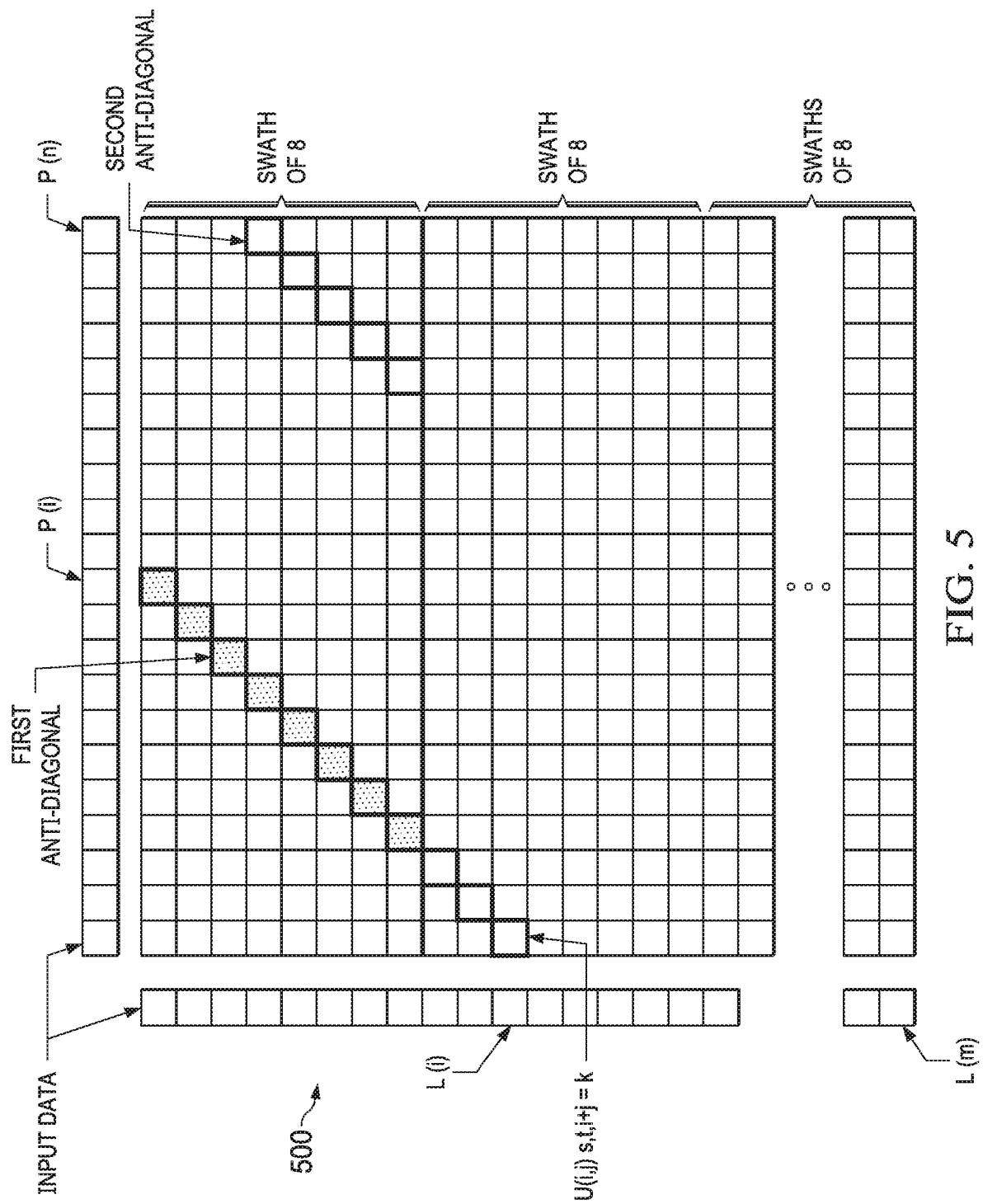
FIG. 5 illustrates a diagram of an example of a matrix divided into swaths for computing a set of recurrence equations according to the principles of the disclosure.

In examples disclosed herein, the disclosure provides an instruction that configures a processor for dynamic programming by computing a new anti-diagonal of a matrix each cycle. When the length of the anti-diagonal is greater than the available parallel computing capacity per cycle, then the elements of the anti-diagonal can be computed in swaths. This is advantageous when the matrix is, for example, 100 by 100. A swath is a designated number of rows of a matrix that are computed in parallel, which includes substantially parallel, during a cycle. As such, the size, or number of rows of a swath, can correspond to the number of execution cores designated for computing elements of the matrix in parallel during a cycle. The swath size can be set by the instruction. When using swaths, a first swath of rows can be computed, followed by a second swath of rows, and so on until each element of the matrix is computed. When employing swaths, the intermediate state of the bottom row of a swath can be saved and used for the first row of the next swath. FIGS. 4-5 provide examples of a matrix and swaths of 16 and 8, respectively.

The disclosed features can be manifested is several ways. For example the hardware of a processor can be configured, i.e., arranged and ordered, to implement an instruction for dynamic programming. Register-transfer level (RTL) can be used to code a set of recurrence equations for the instruction. A compiler can also be employed to generate the instruction for configuring the hardware logic for dynamic programming. Different instructions can be used to configure the hardware to compute different sets of recurrence equations via dynamic programming. Various sets of recurrence equations for the different instructions can be stored in libraries. The libraries can include optimized processes for computing the recurrence equations. In some examples, a set of recurrence equations may include a single recurrence equation.

Figure 1:
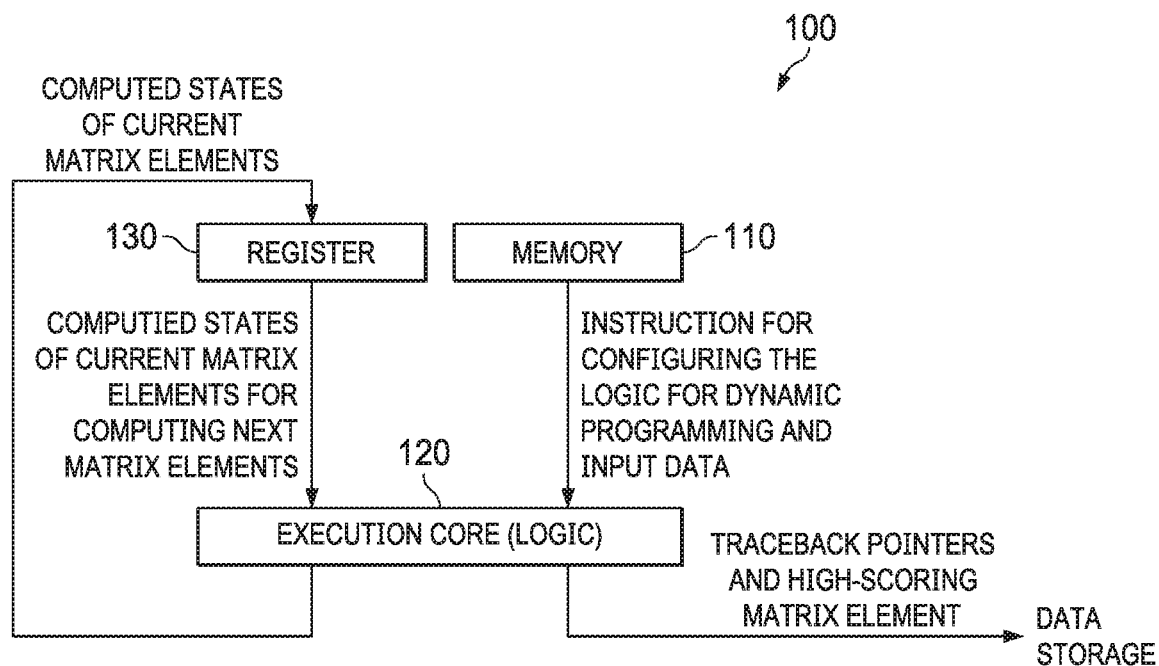
FIG. 1 illustrates a block diagram of an example of a processor for performing dynamic programming according to the principles of the disclosure.
Figure 2:
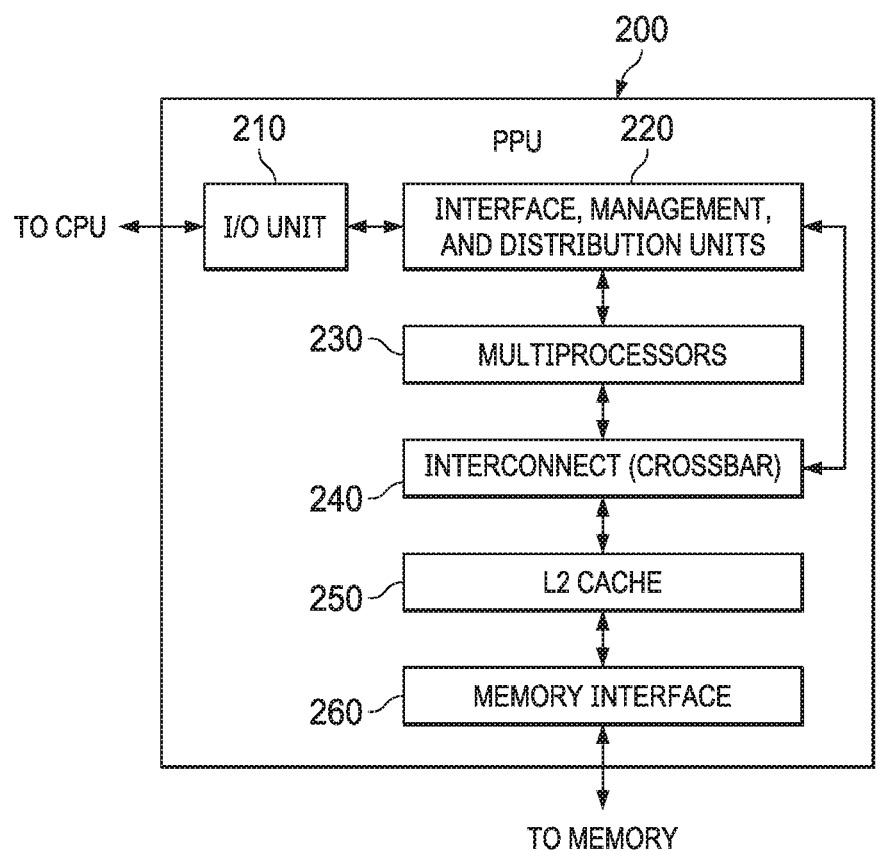
FIG. 2 illustrates a block diagram of an example of a parallel processing unit constructed according to the principles of the disclosure.
Figure 3:
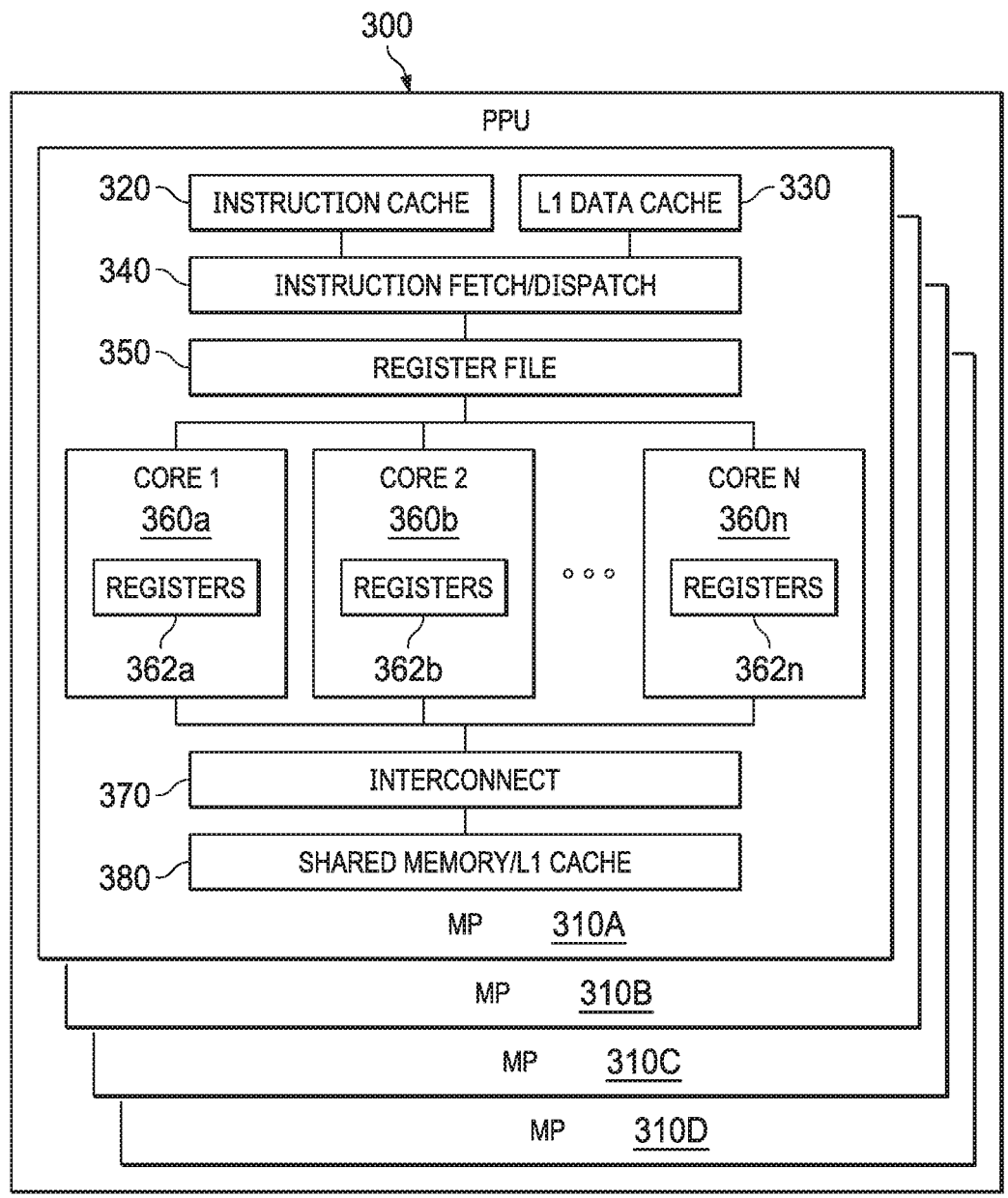
FIG. 3 illustrates a block diagram of an example of a parallel processing unit having multiple multiprocessors.

FIG. 1 illustrates a block diagram of an example of a processor 100 for performing dynamic programming according to an instruction. The processor 100 can be a parallel processor, such as a GPU. FIGS. 2 and 3 provide examples of parallel processing units having multiprocessors with multiple execution cores that can be configured for dynamic programming based on an instruction. The processor 100 can also be a serial processor, such as a CPU. Accordingly, the instruction can be used to configure a Single-Instruction, Multiple-Data (SIMD) extension to approximate a parallel processing unit such as a GPU. Alternatively, the main CPU can be configured by the instruction instead of an extension of the CPU.

Using the dynamic programming via the instruction, the processor 100 generates a result that can be provided as an output. The output can be a solution to a complex problem, such as sequencing. Accordingly, the output can include traceback pointers, record the high-scoring matrix element, or a combination of both. The output can be provided to a computing device for additional processing or reporting. For sequencing, the output can be provided for further use in a genomics pipeline.

The processor 100 includes a memory 110, an execution core 120 and a register 130. The processor 100 can include more than one of any one of these components and can also include additional components typically included in a processor. Each of the components of the processor 100 can be connected via conventional connections employed in processors. The register 130 can be an internal register of the execution core 120.

The memory 110 is configured to store input code including an instruction that specifies mathematical operations to compute a set of recurrence equations employing a matrix and generate computed states for current elements of the matrix. The computed states are states or values of matrix elements determined based on the set of recurrence equations and input data. The memory 110 may also contain the input data, such as sequences to be aligned. In some examples, the instruction configures the execution core 120 to compute the states for the elements of the matrix in swaths.

Figure 7:
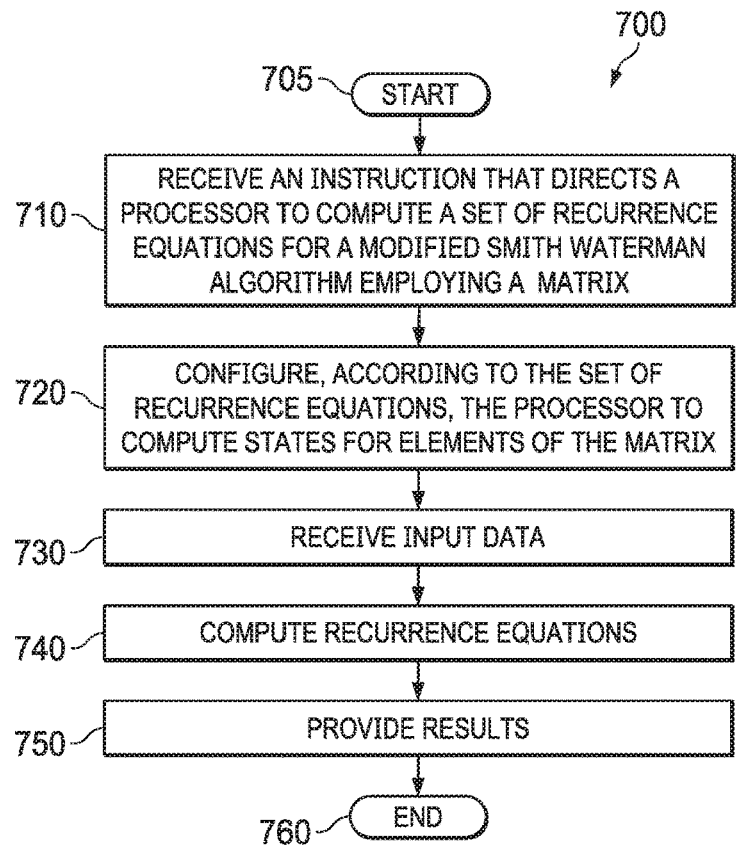
FIG. 7 illustrates a flow diagram of an example of a method for computing, via an instruction, a modified Smith Waterman algorithm carried out according to the principles of the disclosure.

The execution core 120 is configured to receive the instruction and the data. Both the instruction and the data can be received from the memory 110. In some examples, the execution core 120 can receive the instruction from the memory 110 via an instruction cache. Additionally, the execution core 120 can receive the data from a register file that is separate from the memory 110. The execution core 120 is further configured to perform the mathematical operations on the input data to generate the computed states. For example, logic of the execution core 120 is arranged according to the set of recurrence equations to generate the computed states based on the input data. As such, configuration of the logic of the execution core 120 varies depending on the set of recurrence equations for which dynamic programming is being performed. For the area of genomics, the below discussion regarding FIG. 7 provides an example of the logic configuration for computing a modified Smith Waterman algorithm.

The execution core 120 can be configured to generate computed states for current elements of the matrix elements. The current elements of the matrix are a subset of the matrix elements, in which the computed states are generated in parallel. For example, the execution core 120 can generate computed states for current elements that are an anti-diagonal of the matrix. The execution core 120 is configured to send the computed states, such as for the current matrix elements of the anti-diagonal, to the register 130 for storage. The execution core 120 is also configured to retrieve the computed states for the current elements when determining the computed states for the next elements of the matrix, e.g., a subsequent anti-diagonal. In one or more example, the next elements of the matrix are the elements computed in the immediate cycle after the current element states are computed. The execution core 120 can be one of a plurality of parallel execution cores wherein at least some of the execution cores are configured to compute a state for a single matrix element each cycle. The execution core 120 can compute the matrix elements in a systolic manner.

As a computed state for each element is computed, the execution core 120 is further configured to generate a value associated with the element. The value may include the computed value, a "traceback pointer" indicating which previous value was used to compute the computed value, or both. The value can be provided as an output and can be, for example, stored for further processing or analysis. The output value can be provided to a data storage, such as a shared memory or a register file of the processor 100 (neither shown in FIG. 1), for storage.

The register 130 is configured to store the computed states generated by the execution core 120. As noted above, the register 130 can store computed states for current elements of the matrix, such as an anti-diagonal. The register 130 can provide the computed states for the current matrix elements to the execution core 120 for generating the computed states for the next matrix elements. More than one register may be used to store the computed states for the current matrix elements. For example, if the set of recurrence equations is a modified Smith Waterman, then three registers can be used as discussed below regarding FIG. 7. For a straight Smith Waterman (no affine gap penalties), a single register can be used.

The register 130 can be an internal register of the execution core 120, such as an input register of the execution core 120. In some examples, the register 130 can be a state register in the arithmetic logic unit (ALU) of the processor 100. Being part of the execution core 120 reduces and/or eliminates latency and bandwidth concerns for communicating (i.e., transmitting and receiving) computed states between the execution core 120 and the register 130.

FIG. 2 illustrates a block diagram of an example of a parallel processing unit (PPU) 200 constructed according to the principles of the disclosure. The PPU 200 can be part of a desk top computer, a laptop computer, a computer tablet or pad, a smart phone, or another type of computing device. The PPU 200 can be part of a computing system having multiple PPUs that is employed, for example, in a data center. The PPU 200 can be coupled to a central processor that communicates with the PPU 200 to enable the PPU 200 to perform operations. For example, the central processor can execute a driver kernel that implements an application programming interface (API) to enable an application or applications running on the central processor to schedule operations for execution on the PPU 200. An application can direct a driver kernel to generate one or more grids for execution. The PPU 200 can have a SIMD architecture where each thread block in a grid is concurrently executed on a different data set by different threads in the thread block. The PPU 200 includes an input/output (I/O) unit 210, interface, management, and distribution (IMD) units (collectively referred to as IMD units 220), multiprocessors 230, an interconnect 240, an L2 cache 250, and a memory interface 260.

The I/O unit 210 is configured to communicate with the central processor to transmit and receive commands, data, etc., collectively referred to as communications. The communications can be sent over a system bus connected to the central processor. The I/O unit 210 can be a conventional interface, such as a Peripheral Component Interconnect (PCI) interface. For example, the I/O unit 210 can be a PCI Express (PCIe) interface for communicating over a PCIe bus.

The IMD units 220 are configured to route communications for the PPU 200, decode commands received via the I/O unit 210, and transmit the decoded commands to other components or units of the PPU 200 as directed by the commands. The IMD units 220 can also use pointers to select commands or command streams stored in a memory by the central processor. The IMD 220 can further manage, select and dispatch grids for execution by the multiprocessors 230.

The PPU 200 includes multiprocessors 230 that can store an instruction as discussed above with respect to FIG. 1, and can include the combinational logic for performing the mathematical computations according to the recurrence equations denoted by the instruction. The multiprocessors 230 can also include registers with the logic that store the computed states, such as computed states of a current anti-diagonal of a matrix. Register files can also be included in the multiprocessors 230 and used to store intermediate states of the last row of a swath for computing the first row of matrix elements in the next swath.

The multiprocessors 230 are parallel processors that can concurrently execute a plurality of threads from a particular thread block. The multiprocessors 230 can be streaming multiprocessors (SM) that have Computer Unified Device Architecture (CUDA) cores, also referred to as streaming processors (SP), which execute the threads. CUDA is a general purpose parallel computing architecture that leverages the parallel computing engines of GPUs available from Nvidia Corporation. Each of the multiprocessors 230 is connected to a level-two (L2) cache 250 via an interconnect 240. The interconnect 240 can be a crossbar or other type of interconnect network used for communicating within a processor. The L2 cache 250 is connected to one or more memory interfaces, represented by memory interface 260, and is shared by the multiprocessors 230 via the interconnect 240. The memory interface 260 can be configured to communicate with a memory device using a data bus for high-speed data transfer. For example, the memory interface 260 can communicate via 64 or 128-bit data buses. Different memory devices can be connected to the PPU 200 via the memory interface 260. The memory devices may be located off-chip of the PPU 200. For example, the memory interface 260 can be coupled to a Dynamic Random Access Memory, such as a Synchronous Dynamic Random Access Memory, that is external to the PPU 200. Data from the memory devices can be fetched and stored in the L2 cache 250. As illustrated in FIG. 3, each of the multiprocessors 230 can also include a dedicated L1 cache.

FIG. 3 illustrates a block diagram of an example of a PPU 300 having a plurality of multiprocessors constructed according to the principles of the disclosure. One of the multiprocessors, 310A, is shown and discussed as a representative of the other multiprocessors, 310B, 310C, and 310D. The multiprocessor 310A includes an instruction cache 320, a data cache 330, an instruction fetch/dispatch unit 340, a register file 350, execution cores 360a to 360n, interconnect 370, and shared memory 380.

The instruction cache 320 can store the instruction as discussed above with respect to FIG. 1. The L1 data cache 330 is configured to store data for processing. The data can include input data that is fetched for dynamic programming processing by the execution cores 360a to 360n. The instruction and data can be received via an I/O interface, such as the I/O unit 210 of FIG. 2. The data can also be retrieved from a memory via a memory interface, such as the memory interface 260.

The instruction fetch/dispatch unit 340 is configured to fetch data from the L1 data cache 330 and provide the data to the execution cores 360a, 360b, 360n. The instruction fetch/dispatch unit 340 is also configured to fetch instructions from the instruction cache 320 and dispatch the instructions to the execution cores 360a, 360b, 360n for execution. As such, the execution cores 360a, 360b, 360n are configured to receive instructions dispatched to them from the L1 instruction cache 320, fetch data from the L1 data cache 330, execute the instructions employing the data, and write results back to memory. When executing, the execution cores 360a, 360b, 360n, can write computed states of current matrix elements to the registers 362a, 362b, 362n, to use for processing in the next cycle. The results or output from the completed processing can be written to, for example, the shared memory/L1 cache 380 or the L2 cache 250 of FIG. 2.

The register file 350 includes registers that can be individually assigned to each of the execution cores 360a to 360n. The register file 350 can include registers that store intermediate states for computed elements of a matrix that are the last row of a swath. More than one register can be assigned to one of the execution cores 360a to 360n.

At least some of the execution cores 360a to 360n can include the combinational logic for performing the mathematical computations according to the recurrence equations denoted in the instruction. In some examples, each of the execution cores 360a to 360n can include the logic for performing the mathematical computations in parallel. Each of the execution cores 360a to 360n include one or more registers, which are denoted in FIG. 3 as registers 362a, 362b, 362n. The registers 362a, 362b, 362n are configured to store the computed states of current matrix elements that are computed according to the instruction. For example, the registers 362a, 362b, 362n store the computed states of a current anti-diagonal of the matrix. In contrast to registers of the main register file of the multiprocessor 310A, register file 350, registers 362a, 362b, 362n are located internal to their corresponding execution core 360a, 360b, 360n. As such, the internal registers 362a, 362b, 362n, are proximate to the execution logic to reduce travel time and bandwidth concerns to store computed states of the matrix elements and use them for computing according to the instruction. The registers 362a, 362b, 362n, can be input registers of the respective execution cores 360a, 360b, 360n.

The interconnect 370 is configured to connect each of the execution cores 360a, 360b, 360n to the register file 350 and the shared memory/L1 cache 380. The interconnect 370 can be a crossbar configured to connect any of the execution cores 360a, 360b, 360n to any of the registers in the register file 350 or memory locations in shared memory/L1 cache 380.

The shared memory/L1 cache 380 is connected to and configured to store data for each of the execution cores 360a, 360b, 360n. The shared memory/L1 cache 380 can be a memory that is dedicated to the multiprocessor 310a. The shared memory/L1 cache 380 can be coupled to a shared L2 cache of a PPU, such as the L2 cache 250 of FIG. 2, wherein data from the L2 cache can be fetched and stored in the shared memory/L1 cache 380 for processing in the execution cores 360a, 360b, 360n.

The shared memory 380 may store a value associated with an element of the matrix as each element is computed. The execution cores 360a, 360b, 360n, can generate the value and provide the value as an output to be stored in the shared memory 380. In some examples, the output can be provided to the register file 350 for storing. The value may include the computed state for the element, a "traceback pointer" indicating which previous element value was used for the computed state, or can include both of these.

FIG. 4 illustrates a diagram of an example of a matrix 400 employed for computing a set of recurrence equations according to dynamic programming and the principles of the disclosure. The matrix 400 includes "m" rows and "n" columns of elements. A state of each element of the matrix 400 is computed according to a set of recurrence equations and input data. Using reference-based alignment in genomics as an example, arrays R and Q are used as input data for FIG. 4 and U (i, j) is used to represent the set of recurrence equations for a Smith Waterman algorithm. R is a reference sequence that is compared to the query sequence Q and a minimum cost edit that matches R and Q is computed using U (i, j) and dynamic programming. The Smith Waterman algorithm can be a modified Smith Waterman that is discussed in more detail below regarding FIG. 7.

An anti-diagonal of the matrix 400, represented by the bolded elements, is an example of the computed states of current elements of the matrix 400 that are generated in parallel by execution cores, such as execution cores 360a to 360n, and stored in registers, such as register 130 and registers 362a to 362n. The computed states can be generated in parallel according to the operating capacity of the processing unit. The number of registers assigned for storing the computed states can correspond to the number of computed states that can be generated in parallel during a cycle. The computed states can be generated in swaths. For a swath of 16, the entire anti-diagonal of FIG. 4 can be computed in a single cycle with 16 execution cores. FIG. 5 provides an example of a matrix that is computed in swaths of 8.

In one example, a computed state for each of the elements of the matrix 400, U(i,j), can depend only on the three elements of the matrix that are directly above, directly to the left, and directly above the element directly to the left, as well as R(j) and Q(i). This is illustrated in FIG. 4 where the computed value of element 420 is a minimum cost edit that matches R(j) and Q(i), and can be determined based on R and Q, the function U(i, j)=max (U(i, j−1), U(i−1, j−1), U(i−1, j)), and a cost associated with inserts, deletions, and mismatches. In FIG. 4, U(i, j−1) corresponds to element 430, U(i−1, j−1) corresponds to element 440, and U(i−1, j) corresponds to element 450. As each element is computed, a value associated with that element may be output. This value may include the element value U(i,j), a "traceback pointer" indicating which previous value of U was used to compute U(i,j), or both. The output may be stored in register file 350, or in shared memory 380. When computing in swaths, the elements of the last row of the swath are stored, such as in a register of the register file 350 or in memory 380, and used for computing states of the first row of the next swath. For example, the computed states of 440, 450, are stored and used to generate the computed state of element 420.

FIG. 5 illustrates a diagram of an example of a matrix 500 divided into swaths of 8 for computing the set of recurrence equations. The matrix 500 includes "m" rows and "n" columns of elements. A state of each element of the matrix 500 is computed according to a set of recurrence equations and input data. Arrays L and P are used as an example of input data for FIG. 5 and U (i, j) is used to represent the set of recurrence equations in, for example, the area of economics, engineering, genomics, communications, etc. A first anti-diagonal and a portion of a second anti-diagonal of the matrix 500 are shown. The first anti-diagonal is illustrated having some elements that are shaded to indicate the elements of the first anti-diagonal that are computed in a first swath. The remaining three elements of the first anti-diagonal are computed in the next cycle of a swath of 8. The remaining three elements of the first anti-diagonal can be computed in the same cycle as the five elements of the second anti-diagonal such that each available execution core, e.g., 8 in this instance, is being used each cycle.

Figure 6:
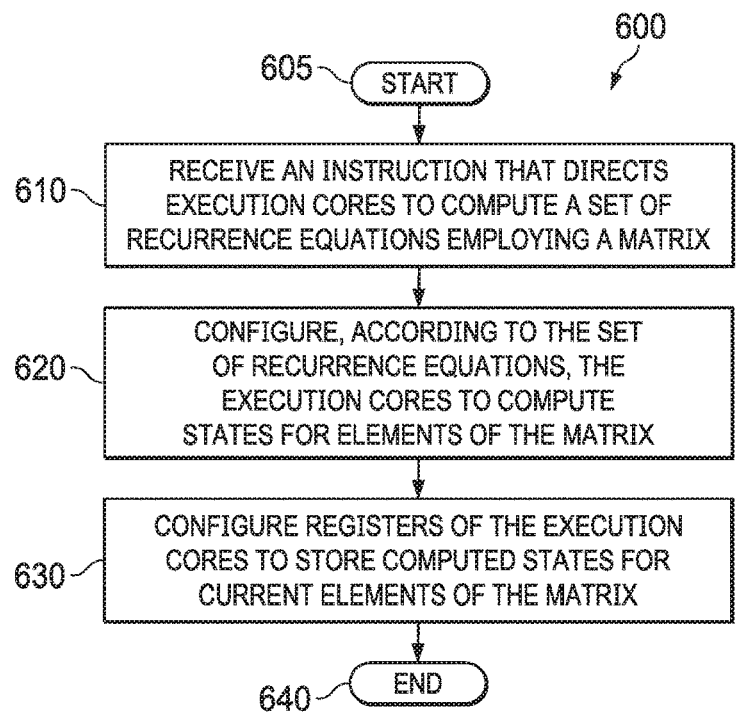
FIG. 6 illustrates a flow diagram of an example of a method for configuring a processor, via an instruction, for dynamic programming.

FIG. 6 illustrates a flow diagram of an example of a method 600 for configuring a processor, via an instruction, to perform dynamic programming. The processor can be a parallel processor or a serial processor. The instruction can be, for example, abstract assembly statements, IR statements, or assembly language instructions associated with a specific ISA for a specific processor or processing unit. The method begins in a step 605.

In a step 610, execution cores of the processor receive an instruction that directs the execution cores to compute a set of recurrence equations employing a matrix. The instruction can be fetched from an instruction cache via a fetch unit and provided to the execution cores. The execution cores can be processing cores of a CPU or a GPU. The recurrence equations can be from different fields including communications, genomics, engineering, and economics. The instruction can direct the execution cores to compute in swaths.

The execution cores are configured, according to the set of recurrence equations, to compute states for elements of the matrix in a step 620. The execution cores can be configured by arranging or organizing the logic of the execution cores according to the recurrence equations to generate the computed states employing the input data. The execution cores can be configured to compute the states for the elements of the matrix in swaths. One execution core can be configured to compute a state for a single matrix element. Multiple execution cores can be configured to compute states of multiple matrix elements in parallel, wherein each of the multiple execution cores computes a state for a single matrix element.

In a step 630, registers of the execution cores are configured for storing the computed states for current elements of the matrix. One or more internal registers of each execution core can store the computed state from a current element of the matrix that is computed by that execution core. The computed states are determined based on the set of recurrence equations and input data. The input data can be, for example, sequences for alignment according to reference-based or de novo assembly.

As noted above, the computations can be done in swaths. Registers or other data storage locations external to the execution cores can be used to store intermediate states for computed elements of a matrix that are the last row of a swath.

The method 600 ends in a step 640. After the configuring, the processor is ready to process input data employing dynamic programming and the recurrence equations.

As indicated in the above discussion, an instruction can be directed to various recurrence equations characterizing the dynamic programming and used to arrange core logic for computations. Examples in the area of genomics include the Needleman-Wunsch algorithm and the Smith Waterman algorithm. An example for Needleman-Wunsch is provided below:

$$S_{i,j}=\max\{S_{i-1,j-1}+m\{i,j\},S_{i-1,j}-D,S_{i,j-1}-D\}$$

wherein $S_{i,j}$ is the score of the best alignment for the prefix of length i of the first input and the prefix of length j of the second input, m[i, j] is the matching score for aligning Q[i] and R{j}, and D is a penalty for an insertion or deletion during alignment.

An example of the recurrence equation for Smith-Waterman is provided below:

$$S_{i,j}=\max\{0,S_{i-1,j-1}+m\{i,j\},S_{i-1,j}-D,S_{i,j-1}-D\}$$

For the Smith-Waterman equation, the zero term in the "max" ensures restarting of alignments whenever a score goes to zero.

A variant of Smith Waterman with affine gap penalties, referred to herein as modified Smith Waterman is another example of an algorithm used for sequence alignment and will be discussed in more detail as an example of using an instruction for dynamic programming.

As noted above, in reference-based sequence alignment, a reference sequence R is compared to a query sequence Q and a minimum cost edit that matches R and Q is computed. For genomic sequences, the alignment assigns letters in R and Q to a single letter or a gap in the opposite sequence. The letters A, C, G, T, are used that correspond to the four nucleotide bases adenine, cytosine, guanine, and, thymine. During a filtering step of the computational pipeline, the alignment may be done to compute just the edit distance. For actual alignment the edit sequence itself is output. To compare sequences R and Q, the modified Smith Waterman algorithm computes the following recurrence equations:

$$I(i,j)=\max(0,H(i,j-1)+o,I(i,j-1)+e);$$

$$D(i,j)=\max(0,H(i-1,j)+o,D(i-1,j)+e);$$

$$H(i,j)=\max(0,I(i,j),D(i,j),H(i-1,j-1)+W(R[i],Q[j]));$$

$$TB(i,j)=\text{source}(H(i,j)).$$

Here H(i,j) is the edit distance at position (i,j). I computes the running cost of an insertion, D the running cost of a deletion, W(r,q) is the cost of substituting character r for q, o is the cost of opening an insert or delete, e is the cost of extending the insert or delete, source returns a two-bit code specifying which of the four arguments of max determined H(i,j), and TB is an array of traceback pointers that identifies the minimum cost path through the matrix, such as the matrix 400. FIG. 7 provides an example of a method directed to computing a modified Smith Waterman algorithm using an instruction.

FIG. 7 illustrates a flow diagram of an example of a method 700 to compute a modified Smith Waterman algorithm employing an instruction according to the principles of the disclosure. The method 700 creates genomic cores that are specialized execution units designed specifically for performing the matrix operations that are the core compute function used in genomics. The genomic cores accelerate the matrix computations of the inner loop of genomics, such as for sequence alignment. The method 700 begins in a step 705.

In a step 710, an instruction is received that directs the processor to compute a set of recurrence equations for a modified Smith Waterman algorithm employing a matrix. As noted above, the set of recurrence equations for the modified Smith Waterman are I(i,j), D(i,j), H(i,j), and TB(i,j). The processor can be a parallel processing unit, such as a GPU, or a serial processor, such as a CPU. Multiple execution cores of the processor can be directed to compute the modified Smith Waterman algorithm.

According to the set of recurrence equations, the processor is configured to compute states for elements of the matrix in a step 720. Multiple execution cores of the processor can be configured to compute the element states in parallel. As such, the hardware of each of the execution cores can be configured to compute a single matrix element per cycle.

For an example of configuring a GPU for computing the modified Smith Waterman recurrence equations for a portion of a diagonal, the GPU can have multiple SMs with 16 SPs that each have a pipeline or "lane", (i.e., a 16-lane SM), with the ability to fetch two 64-bit arguments per lane, N=128 elements of the diagonal would be computed each cycle—M=8 on each lane using 16 bit integers. On cycle t of swath s, lane l computes elements of H, I, and D with coordinates (Ns+l, t-l) to (Ns+l+7, t-l-7). As such, each lane (i.e., each SP) is configured by an instruction to compute the elements of H, I, and D.

In a step 730, input data is received for processing by the configured execution cores. The input data can be fetched from a data cache via an instruction fetch unit. The input data is gene sequences, such as R and Q for reference-based assembly. In other examples, the input data can be sequences for de novo assembly that do not include a reference sequence.

In a step 740, the recurrence equations are computed by the configured execution cores employing the input data. The recurrence equations can be computed in parallel in a systolic manner by computing a diagonal (e.g., an anti-diagonal) of I, D, H, and TB simultaneously. On time-step t, positions (i, t-i) can be computed in a systolic manner. When the edge of recurrence array is larger than the number of execution cores, the array can be computed in swaths such as discussed above with respect to FIG. 5.

The computations can be performed using 16-bit integers. For gene sequence comparison, each element of R and Q can be 3-bits—encoding, for example, A, G, T, C, and N (unknown). For protein sequence comparison, elements R and Q can be 5-bits—to encode the amino acids.

For long reads, where R and Q are upwards of $10^4$ in length, different algorithms can be used, such as the Genome Alignment using Constant-memory Trace-back (GACT) and GACT-X algorithms, to compute alignments in a tiled manner. These algorithms use dynamic programming for aligning arbitrarily long sequences using constant memory for the compute-intensive step. By overlapping tiles by more than the maximum expected gap size optimal alignments can be obtained. GACT-X reduces the computation required by not computing portions of the array where the edit cost exceeds a threshold.

For the computations of step 740, computed states for current elements of the matrix are stored in one or more registers of the execution cores. The computed states for the current elements of the matrix can be the state of H, I, and D and the state of the substitution matrix W which can be replicated for bandwidth. The register, or registers, can be state registers associated with the execution cores, such as internal registers of the execution cores denoted as registers 362a, 362b, 362n in FIG. 3 Accordingly, the computed states for current matrix elements can remain internal to genomics core. For example, only the last diagonal of H, I, and D (eight-elements per lane) needs to be retained. Each cycle, each lane reads R[Ns+l] to R[Ns+l+7] and Q[t-l] to Q[t-l-7] from the registers.

An output value can be generated when computing the computed states and can be output with the traceback pointers. The traceback pointers TB[Ns+l, t-l] to TB[Ns+l+7, t-l-7] can be written back to register files, such as register file 350 of FIG. 3, and can be ultimately copied to shared memory, such as shared memory 380. When computing in swaths, intermediate states of the last row of a swath are also stored. A memory location external to the execution cores can be used to store the intermediate states. Step 740 is completed when each element of the matrix is computed.

Results of computing the modified Smith Waterman algorithm are provided in a step 750. When the computation is complete, the edit distance is the minimum of H(i,j) across the bottom row ($i_{max}$) and right column ($j_{max}$). If only the edit distance is needed, TB is not needed. TB is used to reconstruct the actual alignment by walking the path back from the minimum scoring boundary location. The method 700 ends in a step 760.

The logic needed for performing the above processing can be part of the architecture of a GPU, such as described herein. Consider for example the recurrence equation I (i,j), which is the max of 0, H(i,j-1)+o, and I(i,j-1)+e. Determining the max of these three components requires taking the H computed value for the matrix element of the same row and adjacent column to the left and adding the constant o. This requires an adder. An additional adder is needed to add e to the computed I from the above row, same column. Another adder and multiplexer is needed to compare these two values and select one that is greater. Another adder is then needed to compare the greater value to 0. The result of this comparison is then multiplexed out. As such, an execution core can be configured to compute I (i,j) using four adders (two used as comparators) and two multiplexors.

Similarly for D(i,j), four adders and two multiplexors can be used. For H(i,j), an adder is needed to add H(i-1, j-1) and W(R[i],Q[j]), wherein W can be a table look up for determining the cost of substituting Q for R. The look up cost is then added to H from the matrix element that is above and to the left. Three comparators would then be needed to determine which is the greatest of the four components and another multiplexor for the selected output.

The TB(i,j) can be stored to indicate how H(i, j) was computed and then used to trace back the path. TB(i,j) can be sent to a register files at each cycle. Accordingly, in one example, five adders, seven comparators, and a table lookup can be used for computing the recurrence equations of the modified Smith Waterman algorithm. The table for the table lookup can be stored in registers of a compute unit, such as the registers of the execution cores disclosed herein. Alternatively, a fixed table can be encoded in logic and used for the lookup. The table can have, for example, 16 entries of 16 bits each for a total of 256 bits.

For other recurrence equations, the logic can be configured differently.

For a CPU, the instruction can be used to configure a SIMD extension to approximate a GPU. Using a vector extension as an example, a vector length of 128 is divided into 8 lanes of 16 bits with the same computation per the set of recurrence equations being performed on each lane. For a vector length of 256, 16 lanes of 16 bits can be created for simultaneous computing. Alternatively, instead of an extension the main CPU can be configured, wherein a 64 bit wide data path can be configured into 4 lanes for processing 16 bits in each of the 4 lanes.

The features disclosed herein can also be employed in a complete genomics pipeline. A complete pipeline for performing assembly from reads involves seeding, filtering, alignment, consensus, and variant calling. The Smith Waterman instruction processor can accelerate the filtering and alignment stages. Using a GPU as an example, with a multiple of M=8 cells per lane, and 16 lanes, a single 16-wide SM would compute 128 elements per cycle, a speedup of 4,736× compared to a Xeon core, which takes 37 cycles to compute a single element. A GPU with 80 SMs would have a speedup of 378,880×. Area can be traded off against performance by varying M. For example, if only gene sequences need to be aligned, as many as 21 base pairs can be packed in each 64-bit argument (3 bits per base pair), allowing an increase of M to 21 before running out of input bandwidth. If proteins need to be aligned, 12 amino acids (5 bits per amino acid) can be packed in each input argument—limiting M to 12.

During the filtering stage, alignment is done to compute cost. The modified Smith Waterman instruction can simplify finding the minimum edit cost, and its position, by keeping the state. A subsequent instruction can then be used to query this hidden state. In the alignment stage, alignment is done and traceback is then performed from the minimum cost position to give the minimum cost alignment. For efficiently employing a GPU for traceback—a pointer chasing from shared memory (with encoded pointers) may be employed to ensure traceback does not become a bottleneck for the pipeline.

In addition to the above noted equations in the area of genomics, instructions can be directed to recurrence equations in other fields for characterizing dynamic programming and arranging core logic for computations. In the area of computer science, the traveling salesman problem algorithm can be used for determining the most efficient route for data travel between nodes. Below is an example using nodes instead of cities:

$$f(i; j_1, j_2, \cdots, j_k) = \min_{1 \leq m \leq k} \{d_{ij_m} + f(i; j_1, j_2, \cdots, j_{m-1}, j_{m+1}, \cdots, j_k)\}$$

wherein $f(i; j_1, j_2, \ldots, j_k)$ is the length of a minimum path from i to 0 (the starting point) which passes only once through each of the remaining k unvisited nodes, and $d_{ij}$ is the distance between the ith and jth nodes.

Other examples of recurrence equations include the Viterbi algorithm that can be used as a decoding algorithm for communication systems, and the Longest Common Subsequence algorithm that can be used to differentiate between two examples of text.

The instructions can be used to configure hardware logic of execution cores for processors, such as CPUs and GPUs. The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip.

The processors or computers can be part of GPU racks located in a data center. The GPU racks can be high-density (HD) GPU racks that include high performance GPU compute nodes and storage nodes. The high performance GPU compute nodes can be servers designed for general-purpose computing on graphics processing units (GPGPU) to accelerate deep learning applications. For example, the GPU compute nodes can be servers of the DGX product line from Nvidia Corporation.

Portions of disclosed embodiments may relate to computer storage products, such as a memory, with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

What is claimed is:

1. A method of configuring a processor for dynamic programming according to an instruction, comprising:
    receiving, by execution cores of the processor, at least one instruction that directs the execution cores to compute a set of recurrence equations employing a matrix, wherein the at least one instruction specifies at least one mathematical operation to compute the set of recurrence equations;
    configuring hardware logic of the execution cores, according to the at least one mathematical operation and the set of recurrence equations, to evaluate the set of recurrence equations;
    evaluating the set of recurrence equations and computing states for elements of the matrix using the configured hardware logic;
    and
    storing the computed states for current elements of the matrix in registers of the execution cores, wherein the computed states are determined based on the set of recurrence equations and input data.

2. The method as recited in claim 1, wherein the configuring includes configuring each of the execution cores to compute a single one of the computed states during a cycle.

3. The method as recited in claim 1, wherein the configuring includes configuring the execution cores to compute the computed states in swaths, wherein a swath corresponds to a number of rows of the matrix.

4. The method as recited in claim 3, further comprising storing intermediate states of matrix elements on the last row of the swath for computing states of the first row of the next swath.

5. The method as recited in claim 4, wherein the intermediate states are stored in a register file of the processor or a shared memory of the processor.

6. The method as recited in claim 1, wherein a computed state for each of the elements of the matrix depends only on the three elements of the matrix that are directly above, directly to the left, and directly above the element directly to the left.

7. The method as recited in claim 1, wherein the set of recurrence equations includes a single recurrence equation.

8. The method as recited in claim 1, wherein the set of recurrence equations is a set of genomic recurrence equations.

9. The method as recited in claim 8, wherein the set of genomic recurrence equations are Smith Waterman recurrence equations or modified Smith Waterman recurrence equations.

10. The method as recited in claim 1, further comprising receiving at least one other instruction that directs the execution cores to compute a different set of recurrence equations and configuring the hardware logic according to at least one mathematical operation specified by the at least one other instruction to compute the different set of recurrence equations.

11. The method as recited in claim 8, wherein the set of genomic recurrence equations are Needleman-Wunsch recurrence equations.

12. The method as recited in claim 1, wherein the at least one instruction is an assembly language instruction for configuring the hardware logic of the execution cores.

13. The method as recited in claim 1, wherein the at least one instruction is abstract assembly statements or intermediate representation (IR) statements for configuring the hardware logic of the execution cores.

14. The method as recited in claim 1, wherein the execution cores are parallel execution cores of a graphic processing unit (GPU) and the registers are located internal to the execution cores.

15. A processor, comprising:
a memory configured to store multiple instructions that each specifies at least one mathematical operation to compute a specific set of recurrence equations employing a matrix; and
at least one execution core, having hardware logic arranged into a configuration according to the mathematical operations of one of the multiple instructions, to perform operations including: generate computed states by performing the mathematical operations of the one of the multiple instructions on the input data, and store the computed states for current elements of the matrix in at least one register of the execution core, wherein the hardware logic is arranged into another configuration according to a different one of the multiple instructions and the specific set of recurrence equations when computing a different specific set of recurrence equations.

16. The processor as recited in claim 15, wherein the hardware logic is combinational logic of the at least one execution core and the combination logic is arranged according to the one of the multiple instructions to perform the mathematical operations.

17. The processor as recited in claim 15, wherein the at least one execution core is one of a plurality of execution cores and the one of the multiple instructions directs the plurality of execution cores to perform the mathematical operations in swaths, wherein a swath corresponds to a number of the execution cores designated for processing of the computed states in parallel.

18. The processor as recited in claim 17, further comprising a shared memory or register file configured to store intermediate states of matrix elements on the last row of one of the swaths for computing states of the first row of the next one of the swaths.

19. The processor as recited in claim 15, wherein the processor is a graphics processing unit (GPU) and the at least one register is located internal to the execution core.

20. The processor as recited in claim 15, wherein at least one of the specific set of recurrence equations are modified Smith Waterman recurrence equations.

21. A method of computing a modified Smith Waterman algorithm employing an instruction for configuring hardware of a parallel processing unit (PPU), comprising:
receiving, by execution cores of the PPU, an instruction that directs the execution cores to compute a set of recurrence equations for the modified Smith Waterman algorithm employing a matrix, wherein the instruction further specifies mathematical operations to compute the set of recurrence equations;
configuring hardware of the execution cores, according to the mathematical operations and the set of recurrence equations, to compute states for elements of the matrix in parallel and in swaths; and
computing computed states for current elements of the matrix in swaths, wherein the computed states are determined based on the set of recurrence equations and input sequences.

22. The method as recited in claim 21, further comprising storing intermediate states from elements of the last row of the swaths in at least one memory associated with the PPU that is external to the execution cores, and employing at least one of the intermediate states when computing the computed states for the current elements.

23. The method as recited in claim 21, further comprising storing, in registers located internal to the execution cores, the computed states for current elements of the matrix, and employing the stored computed states when computing the next elements of the matrix.

24. The method as recited in claim 21, wherein the computing provides a computed state for each element of the matrix.

25. The method as recited in claim 24, further comprising providing an output, wherein the output provides a result of the computing that includes traceback pointers, edit distance, or a combination of both.

* * * * *